Oct. 19, 1965　　　M. H. NEUHARDT ETAL　　　3,212,938
SWITCH FOR CORDLESS ELECTRICAL DEVICE
Filed Oct. 17, 1962　　　　　　　　　　　　　　2 Sheets-Sheet 1
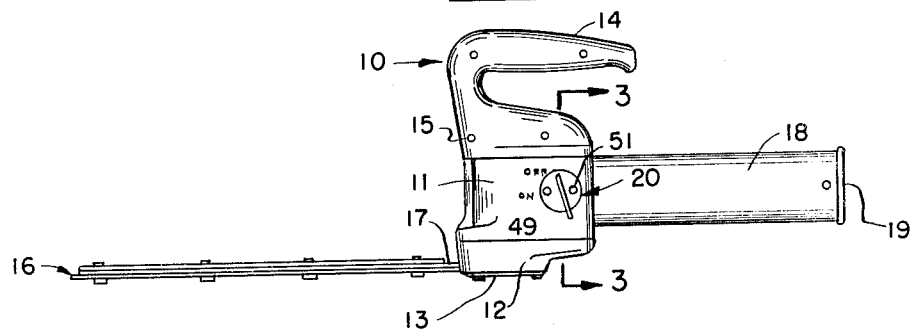
INVENTORS
MELVIN H. NEUHARDT
HARRY L. BEAM
BY Leonard Bloom
ATTORNEY Oct. 19, 1965   M. H. NEUHARDT ETAL   3,212,938
SWITCH FOR CORDLESS ELECTRICAL DEVICE
Filed Oct. 17, 1962   2 Sheets-Sheet 2
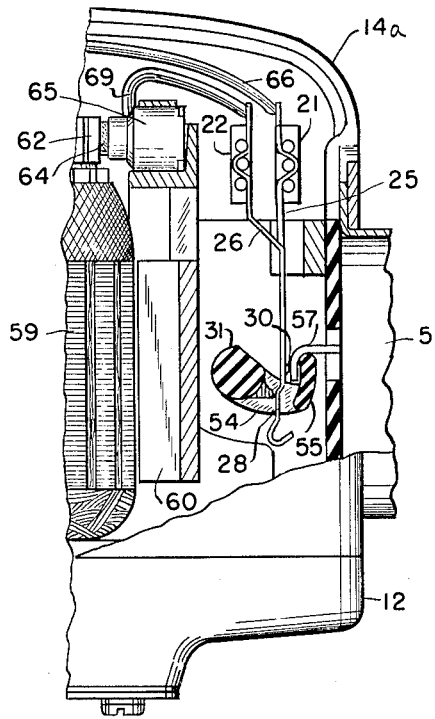
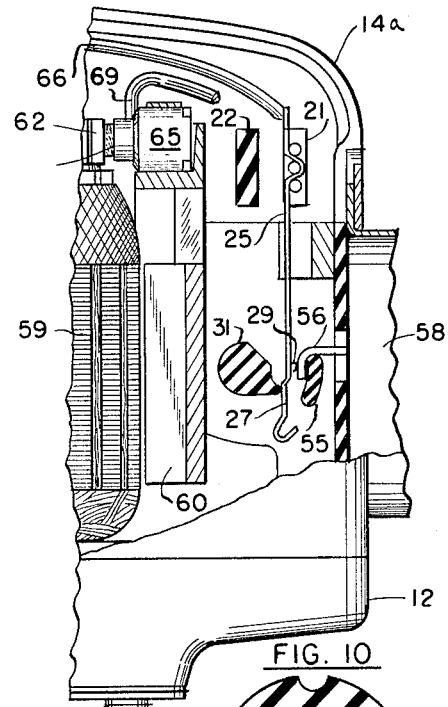
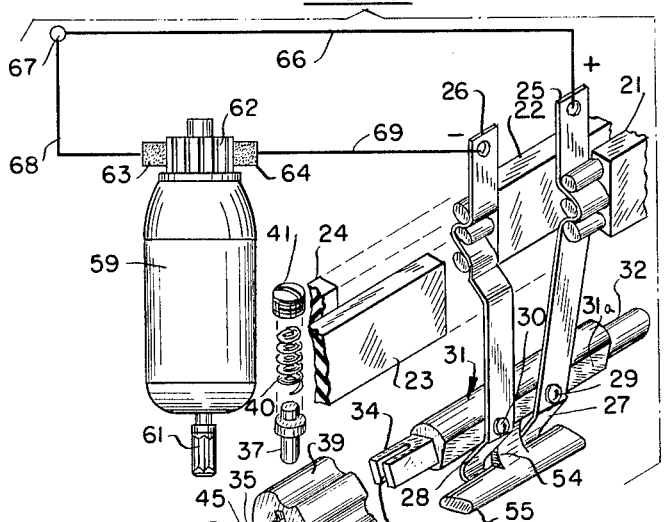
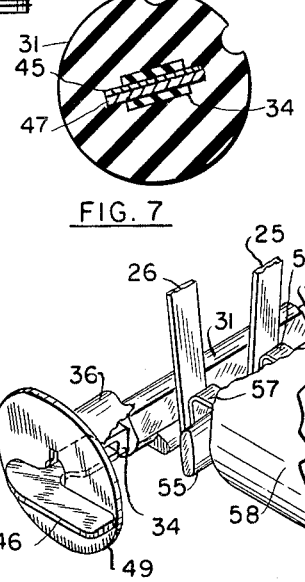
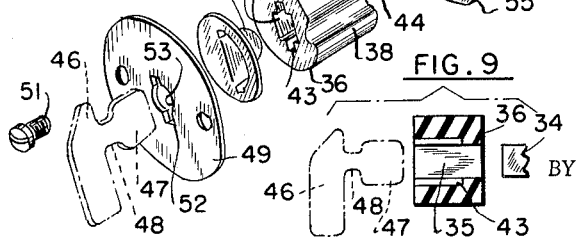
INVENTORS
MELVIN H. NEUHARDT
HARRY L. BEAM
BY Leonard Bloom
ATTORNEY

United States Patent Office 3,212,938
Patented Oct. 19, 1965

3,212,938
SWITCH FOR CORDLESS ELECTRICAL DEVICE
Melvin H. Neuhardt, Baltimore, and Harry L. Beam, Towson, Md., assignors to The Black and Decker Manufacturing Company, Towson, Md., a corporation of Maryland
Filed Oct. 17, 1962, Ser. No. 231,165
9 Claims. (Cl. 136—181)

The present invention relates to a switch for a cordless electric device, and more particularly, to an on-off key-type of safety switch for use with a cordless electric device having a slide-out battery pack.

Recently, various cordless electric devices have been developed which utilize a self-contained, but removable, power pack to energize a highly-efficient direct-current electric motor that in turn supplies the motive power for the device. The power pack usually comprises a battery of rechargeable energy cells, stacked one on top of another and suitably interconnected electrically; and preferably, but not necessarily, the power pack has a slide-out connection with the cordless device itself. Consequently, whenever the power pack has become discharged, it may be quickly and easily removed from the device and replaced with another power pack; and in the interim, while the original power pack is being recharged, the cordless device may continue to function without any appreciable interruption.

However, whenever a new power pack is inserted within the cordless device, a safety hazard may be presented, should the mere insertion of the power pack be sufficient to activate the device itself. This is especially pronounced where the cordless device utilizes one or more cutting blades that are normally exposed, as for example, a cordless electric hedge trimmer that utilizes a stationary blade and one or more movable blades that reciprocate with respect to the stationary blade. Under such circumstances, it will be appreciated that should the switch for the cordless hedge trimmer be turned "on" inadvertently in the interim period, that the subsequent insertion of a power pack within the unit would be hazardous, not only to the user, but to others within his vicinity.

Accordingly, it is an object of the present invention to alleviate this safety hazard by providing, for use in conjunction with a cordless electric device having a removable power pack, a safety switch which will prevent the engagement of the electrical contacts of the device with the respective terminals of the power pack, and hence prevent the activation of the device itself, in the event that the switch had been moved inadvertently to its "on" position prior to the insertion of the power pack.

It is another object of the present invention to provide a safety switch, whereby, whenever the switch is moved to its "on" position, the normally-removable power pack cannot thereafter be removed from the cordless device until the switch has first been moved back to its "off" position.

It is yet another object of the present invention to provide a switch including a key insertable within the housing of the device so as to manually move the switch from its "off" position to its "on" position, thereby activating the cordless device, in combination with means secured to the housing to prevent the key from being removed in the "on" position of the switch.

It is still another object of the present invention to provide an on-off key-type of locking switch for a cordless electric device, wherein the switch many be manufactured easily and economically, and wherein the components of the switch are sturdy and durable so as to provide reliable performance over extended periods of usage.

In accordance with the general teachings of the present invention, there is provided a safety switch suitable for use in a cordless electric device of the type which is provided with a removable power pack having a pair of terminals. The switch has an "on" position and an "off" position and includes a member which is movable within a housing. The member has an initial position corresponding to the "off" position of the switch, and the member further has an alternate position corresponding to the "on" position of the switch. A key is insertable within the housing so as to engage the member and move the member from its initial position to its alternate position, thereby moving the switch to its "on" position; and means are secured to the housing for preventing the key from being removed from the housing in the alternate position of the member. Electrical contact means are provided, movable in response to movement of the member, to engage the respective terminals of the power pack in the alternate position of the member. The member includes means integrally formed therewith for preventing the power pack from being removed from the housing in the alternate position of the member; and this last-named means also prevents the engagement of the electrical contact means with the respective terminals of the power pack in the event that the switch had already been moved to its "on" position prior to the insertion of the power pack within the device.

In accordance with the specific teachings of the present invention, there is provided a safety switch suitable for use in a cordless electric device of the type which is provided with a removable power pack having a pair of spaced L-shaped terminals. The switch has an "on" position and an "off" position and includes an insulated pin member journaled within a housing for limited rotation about its axis. The pin member is keyed to a collar for rotation in unison; and detent means are provided between the collar and the housing, such that the member has an initial position corresponding to the "off" position of the switch, and such that the member has an alternate position corresponding to the "on" position of the switch. A key is insertable within the housing to engage the collar and move the collar, and hence the member, from its initial position to its alternate position, thereby turning the switch to its "on" position and energizing the cordless electric device. Means, such as a cover plate, are secured to the housing for preventing the key from being removed from the housing in the alternate position of the member. A transverse cam arm is integrally formed with the member intermediate its ends, and a locking arm is integrally formed on the end of the cam arm. The locking arm projects radially of the pin member, extends to either side of the cam arm, and is substantially parallel with the pin member. A pair of spaced-apart cantilevered contact strips are supported within the housing and have respective end portions which are received between the member and its integral locking arm, one on each side of the integral transverse cam arm. Consequently, the end portions of the contact strips are guided by the member and are movable in response to the movement of the member. Respective electrical contacts are carried on the end portions of the contact strips, and whenever the member is moved from its initial position to its alternate position corresponding to the "on" position of the switch, the electrical contacts engage the respective L-shaped terminals of the power pack. Simultaneously to their engagement with the electrical contacts, the L-shaped terminals of the power pack are received between the insulated pin member and its integral locking arm, thereby preventing the removal of the power pack from the device as long as the switch is in its "on" position. Consequently, it will be appreciated that the insulated pin member, and more particularly its integral locking arm, provides the dual function, first, of preventing the power pack from being removed from the housing in the "on" position of the switch, and secondly, of preventing the engagement of the electrical contacts with the respective terminals of the power pack in the event that the switch had already been turned "on" prior to the insertion of the power pack within the device. Consequently, a dual safety feature is provided; and this, in combination with the key which is insertable within the housing together with the means to prevent the key from being removed in the "on" position of the switch, renders it impossible to inadvertently activate the device by the mere insertion of the power pack within the device.

These and other objects of the present invention will become apparent from a reading of the following specification, taken in conjunction with the enclosed drawings, in which:

FIGURE 1 is a side elevational view of a typical cordless electric device with which the present invention may find more particular utility, the switch being illustrated in its "off" position;

FIGURE 2 is an end elevation of the device illustrated in FIGURE 1, with the scale enlarged over that of FIGURE 1, and with the rear handle (which houses the removable power pack) having been removed from the device, the switch means being illustrated in its "on" position;

FIGURE 3 is a section view taken along the lines 3—3 of FIGURE 1, enlarged over the scale of FIGURE 1, and looking rearwardly of the device with the switch being in its "on" position;

FIGURE 4 is a section view taken along the lines 4—4 of FIGURE 2;

FIGURE 5 is a section view taken along the lines 5—5 of FIGURE 2;

FIGURE 6 is an exploded perspective view of the switch means of the present invention, the switch being illustrated in its "off" position, and the interconnection of the switch and the electric motor being illustrated schematically;

FIGURE 7 is a perspective view corresponding to a portion of FIGURE 6 but showing the components of the switch in assembled relationship to each other, and further showing the L-shaped terminals of the power pack being retained by the integral locking arm portion of the insulated member of the switch, the switch being in its "on" position;

FIGURES 8a through 8e are schematic views showing, in sequence, the usage and inherent safety features of the present invention;

FIGURE 9 is a longitudinal section of the detent collar of the switch, showing a portion of the pin member in exploded relationship, and further showing the key in broken lines; and FIGURE 10 is a section view, taken along the lines 10—10 of FIGURE 2, enlarged over the scale of FIGURE 2, and showing the key inserted within the detent collar.

With reference to FIGURE 1, there is illustrated a cordless electric hedge trimmer 10 with which the teachings of the present invention may find more particular utility, although it will be appreciated that the essence of the present invention is equally applicable to a wide variety of cordless electric tools, appliances and devices. With this in mind, the hedge trimmer 10, which is the subject of the co-pending Riley et al. application S.N. 184,904 filed April 3, 1962, entitled "Cordless Electric Hedge Trimmer Assembly," and assigned to the same assignee as that of the present invention, comprises an overall housing which includes a motor housing 11 and a gear case 12 having a cover plate 13, an overhead handle 14 secured to the motor housing 11 by means of screws 15, a blade assembly designated generally as at 16 and including a movable blade 17 adapted to reciprocate in a longitudinal direction, a rear portion 18 of the overall housing, which portion is preferably formed as a handle and is adapted to receive a slide-out battery or power pack, an end cover 19 which is quickly and easily removable from the rear housing portion 18, and finally an on-off key-operated safety switch designated generally as at 20.

With reference to FIGURES 2 through 6, the overhead handle 14 is split longitudinally into two complementary mating halves comprising a bottom half 14a and a top half 14b which are detachably joined together along a common longitudinal midplane. The bottom half 14a has a pair of spaced-apart insulated contact supports 21 and 22; contact support 21 terminates short of the common longitudinal midplane, while the other contact support 22 projects beyond the common longitudinal midplane and into part of the space normally confined by the top half 14b of the handle 14. The top half 14b is provided with a pair of complementary lands 23 and 24, see FIGURES 3 and 6, which are adapted to confront the contact supports 21 and 22, respectively, when the mating halves 14a and 14b are secured together. A pair of cantilevered contact strips 25 and 26 are carried by the contact supports 21 and 22, respectively. Contact strip 25 may be designated as the positive strip, whereas the contact strip 26 may be designated as the negative strip. Contact strips 25 and 26 are preferably formed from a resilient highly-conductive material, such as a beryllium-copper alloy, although other materials are feasible and within the scope of the present invention. The contact strips 25 and 26 have respective lower portions 27 and 28 depending below the supports 21 and 22, and suitable electrical contacts 29 and 30, respectively, are secured thereto. Preferably, the contacts 29 and 30 are of a highly-conductive material, such as a silver alloy. The contact strips 25 and 26 are guided within, and move in response to, an insulated pin member 31 which may be molded from plastic or other suitable material. The member 31 has an end portion 32, preferably of a reduced diameter, which is received within a corresponding recess 33 formed in the motor housing 11; and hence the member 31 is journaled within the motor housing 11 for limited rotation about its longitudinal axis. The opposite end 34 of the member 31 has a substantially rectangular cross-section and is received within a suitably slotted recess 35 formed within a collar 36. The collar 36 is thereby keyed to the member 31 for rotation in unison, and detent means are provided between the collar 36 and the motor housing 11. The detent means comprises a spring-loaded detent 37 adapted to be received within one or the other of a pair of longitudinal recesses 38 and 39 formed on the external surface of the collar 36 and circumferentially-spaced one from another. The detent 37 is constantly urged into one of the recesses 38 or 39 on the collar 36 by means of a spring 40, and the spring 40 is backed by a screw 41 which is received within a tapped hole 42 formed in the motor housing 11. Moreover, a blind slotted recess 43 is formed in the collar 36 to communicate with the slotted recess 35 formed therein, see FIGURE 9, while the opposite end portion 34 of the member 31 is itself provided with a slot 44 which is adapted to be aligned with and to communicate with the slotted recess 35 formed within the collar 36. A spring tang member 45 is inserted within the blind slotted recess 43 of the collar 36. A key 46, which includes a key portion 47 and a neck portion 48, is adapted to be inserted within the motor housing 11 so as to be received within the blind slotted recess 43 of the collar 36 and to be resiliently retained therein by means of the spring tang member 45. The key 46 is adapted to have a limited rotary movement, preferably through a slight angle of approximately 75°, so as to move the collar 36 and hence the member 31 from their initial position as shown in FIGURE 6 to their alternate position as shown in FIGURE 7. The initial position of the member 31 corresponds to the "off" position of the switch, while the alternate position of the member 31 corresponds to the "on" position of the switch. A circular cover piece 49 is received within a complementary recess 50 formed in the motor housing 11 and is secured thereto by means of screws 51. The cover piece 49 has a slot 52 and a communicating circular aperture 53, see FIGURE 6; and hence the key 46, and more particularly the key portion 47 thereof, may pass through the slot 52 in the cover piece 49, and the key 46 may then be turned to move the collar 36 and pin member 31 as shown in FIGURE 7, so that the neck portion 48 of the key 46 may swing freely within the circular aperture 53 of the cover piece 49. Thereafter, the key 46 may not be directly removed from the hedge trimmer 10 inasmuch as the key portion 47 is out of alignment with the slot 52 in the cover piece 49. Consequently, it is necessary to first turn the key 46 back to its initial position, and simultaneously turn the switch back to its "off" position, before the key 46 can be removed from the hedge trimmer 10. Consequently, a safety feature is provided in that first, the key 46 is necessary to turn the device "on," and secondly, this key 46 cannot be removed unless the device is first turned "off."

With reference again to FIGURES 2 through 6, and with further reference to FIGURE 7, the insulated pin member 31 has an integrally-formed transverse cam arm 54 formed intermediately the ends thereof and projecting radially beyond the member 31. A locking arm 55 is integrally formed on the end of the transverse cam arm 54 and projects on either side of the cam arm 54, being spaced with respect to the member 31 and substantially parallel to it. The respective lower portions 27 and 28 of the cantilevered contact strips 25 and 26 are received between the member 31 and its integral locking arm 55, one on each side of the transverse cam arm 54; and preferably a flat 31a is formed on the member 31 to aid in controlling the movement of the cantilevered contact strips 25 and 26, it being appreciated that the contact strips 25 and 26 are guided by the member 31 and are movable in response to the movement of the member 31.

Consequently, the key 46 may be inserted within the motor housing 11 so as to engage the collar 36 and then turned so as to rotate the collar 36 and the pin 31 through an angle of approximately 75°; and accordingly, the transverse cam arm 54 of the member 31 guides or moves the lower portions 27 and 28 of the cantilevered contact strips 25 and 26, respectively, such that the electrical contacts 29 and 30 are brought into engagement with the respective terminals 56 and 57 of a slide-out power pack 58. Moreover, the terminals 56 and 57 of the power pack 58 are "L-shaped" and are adapted to be received between the insulated member 31 and its integral locking arm 55, as shown more particularly in FIGURE 7. In such a manner, the power pack 58 may not now be removed from the rear handle housing 18 of the hedge trimmer 10. Consequently, another safety feature is provided, inasmuch as it is not possible to remove the power pack 58 from the cordless electric device 10 whenever the switch is turned to its "on" position, and it is necessary to first turn the switch back to its "off" position prior to removal of the power pack 58. Thus it is not possible to deactivate the cordless device 10 by the mere removal of the power pack 58, and conversely, it is not possible to carelessly leave the switch "on" and to activate the device 10 inadvertently by the mere insertion of the power pack 58. Furthermore, an additional safety feature is provided. If the switch has been turned "off" and the power pack 58 removed, and if the key 46 is then reinserted and the switch turned "on" without the power pack 58 being housed within the device 10, the locking arm 55 will be in its "up" position, see FIGURE 2, and will preclude the proper insertion of the power pack 58, thereby precluding the engagement of the contacts 29 and 30 with the terminals 56 and 57, respectively, of the power pack 58.

With reference to FIGURES 8a through 8e, which are diagrammatic sequence views, the inherent advantages and utility of the present invention will be further explained. In FIGURE 8a, the switch is in its "off" position, and the power pack 58 has already been inserted within the device 10. In FIGURE 8b, the key 46 has been inserted and turned to its "on" position, thereby moving the member 31 so as to bring the contact strips, for example 26, and its contact 30 into engagement with the respective terminal 57 of the power pack 58, thereby energizing the device 10. The L-shaped terminals, such as the terminal 57, are received between the insulated member 31 and its integral locking arm 55, thereby preventing the removal of the power pack 58; and moreover, the key 46 may not be removed. Then, as shown in FIGURE 8c, the switch has been turned "off," and the power pack 58 may be removed. Should the switch be turned back into its "on" position, with the power pack 58 already removed as shown in FIGURE 8d, then the power pack 58 cannot be inserted properly within the rear housing 18; but rather, as shown in FIGURE 8e, the integral locking arm 55 of the member 31 will abut against the L-shaped terminals of the power pack 58, as for example terminal 57, and prevent their engagement with the respective electrical contacts.

In a preferred embodiment, the power pack 58 comprises a slide-out battery pack which includes a series of rechargeable energy cells, stacked one on top of another and electrically interconnected; however, it will be appreciated that other types of power packs are equally applicable to the present invention.

With reference again to FIGURES 4, 5, and 6, the hedge trimmer 10 is provided with a high-efficiency direct-current electric motor which comprises an armature 59 that rotates between a pair of permanently-magnetic tubular segments, one of which is shown as at 60 in FIGURES 4 and 5. Preferably, the armature 59 is of the wound laminated type and includes a pinion 61 formed on one end and a commutator 62 at the opposite end. The commutator 62 is engaged by a pair of electrical brushes 63 and 64, which preferably are formed from a silver or copper graphite composition. The brushes 63 and 64 are housed within suitable brush-holders, one of which is shown as at 65 in FIGURES 4 and 5. A lead 66 connects the positive contact strip 25 to a binding post or terminal 67, which is illustrated schematically in FIGURE 6, and a lead 68 connects the terminal 67 with brush 63. Finally, a lead 69 connects the other brush 64 with the negative contact strip 26.

Obviously, many modifications may be made without departing from the basic spirit of the present invention; and accordingly, within the scope of the appended claims, the invention may be practiced other than has been specifically described.

We claim:
1. In an electrical device which is provided with a removable power pack having a pair of terminals, safety switch means having an "on" position and an "off" position and comprising:
   (a) a housing;
   (b) an insulated member journaled within said housing for limited rotation about its axis;
   (c) said member having an initial position corresponding to the "off" position of the switch, and said member further having an alternate position corresponding to the "on" position of the switch;
   (d) a removable key within said housing to engage said member and move said member from its initial position to its alternate position;
   (e) means to prevent said key from being removed from said housing in the alternate position of said member;
   (f) electrical contact means within said housing, movable in response to the movement of said member, and engaging the respective terminals of the power pack in the alternate position of said member; and
   (g) means to prevent the power pack from being removed from said housing in the alternate position of said member.

2. In an electrical device which is provided with a removable power pack having a pair of terminals, safety switch means having an "on" position and an "off" position and comprising:
   (a) a housing;
   (b) an insulated member journaled within said housing for limited rotation about its axis;
   (c) said member having an initial position corresponding to the "off" position of the switch, and said member further having an alternate position corresponding to the "on" position of the switch;
   (d) a pair of spaced-apart cantilevered contact strips, supported within said housing, and having respective end portions which are guided by said member and which are movable in response to the movement of said member;
   (e) respective electrical contacts carried on said end portions of said contact strips;
   (f) a removable key within said housing to engage said member and move said member from its initial position into its alternate position; and
   (g) means integrally formed with said member for bringing said contacts into engagement with the respective terminals of the power pack in the alternate position of said member.

3. In an electrical device which is provided with a removable power pack having a pair of terminals, safety switch means having an "on" position and an "off" position and comprising:
   (a) a housing;
   (b) an insulated member journaled within said housing for limited rotation about its axis;
   (c) detent means between said housing and said member, whereby said member has at least two positions with respect to said housing, one of which corresponds to the "on" position of the switch, and the other of which corresponds to the "off" position of the switch;
   (d) a pair of spacer-apart cantilevered contact strips, supported within said housing, and having respective end portions which are guided by said member and which are movable in response to the movement of said member;
   (e) respective electrical contacts carried on said end portions of said contact strips; and
   (f) means integrally formed with said member for bringing said contacts into engagement with the respective terminals of the power pack in the "on" position of the switch;
   (g) said last-named means thereafter preventing removal of the power pack from said housing in the "on" position of the switch.

4. In an electrical device which is provided with a removable power pack having a pair of terminals, safety switch means having an "on" position and an "off" position and comprising:
   (a) a housing;
   (b) a member movable within said housing;
   (c) said member having an intial position corresponding to the "off" position of the switch, and said member further having an alternate position corresponding to the "on" position of the switch;
   (d) electrical contact means within said housing, movable in response to the movement of said member, and engaging the respective terminals of the power pack in the alternate position of said member;
   (e) a removable key within said housing to engage said member and move said member from its initial position to its alternate position;
   (f) means secured to said housing for preventing said key from being removed from said housing in the alternate position of said member; and
   (g) means carried by said member for preventing the power pack from being removed from said housing in the alternate position of said member;
   (h) said last-named means also preventing the engagement of said electrical contact means with the respective terminals of the power pack in the event that the switch had already been moved to its "on" position prior to the insertion of the power pack within the device.

5. In an electrical device which is provided with a removable power pack having a pair of terminals, safety switch means having an "on" position and an "off" position and comprising:
   (a) a housing;
   (b) an insulated member journaled within said housing for limited rotation about its axis;
   (c) detent means between said member and said housing, whereby said member has an initial position corresponding to the "off" position of the switch, and whereby said member has an alternate position corresponding to the "on" position of the switch;
   (d) a removable key within said housing to engage said member and move said member from its initial position to its alternate position;
   (e) means secured to said housing for preventing said key from being removed from said housing in the alternate position of said member;
   (f) a pair of spaced-apart cantilevered cantact strips, supported within said housing, and having respective end portions which are guided by said member and which are movable in response to the movement of said member;
   (g) respective electrical contacts carried on said end portions of said contact strips; and
   (h) means integrally formed with said member for bringing said contacts into engagement with respective terminals of the power pack in the "on" position of the switch;
   (i) said last-named means preventing the power pack from being removed from said housing in the alternate position of said member; and
   (j) said last-named means also preventing the engagement of said electrical contacts with the respective terminals of the power pack in the event that the switch had already been moved to its "on" position prior to the insertion of the power pack within the device.

6. In an electrical device which is provided with a slide-out power pack having a pair of L-shaped terminals, a safety switch having an "on" position and an "off" position and comprising:
   (a) a housing;
   (b) an insulated pin member journaled within said housing for limited rotation about its axis;
   (c) detent means between said member and said housing, whereby said member has an initial position corresponding to the "off" position of the switch, and whereby said member has an alternate position corresponding to the "on" position of the switch;
   (d) manually-manipulatable means to move said member from its initial position to its alternate position;
   (e) a transverse cam arm integrally formed on said member intermediate the ends thereof;
   (f) a locking arm integrally formed on the end of said transverse cam arm and extending to either side of said cam arm and substantially parallel to said member;
   (g) a pair of spaced-apart cantilevered contact strips, supported within said housing, and having respective end portions received between said member and said locking arm thereof, one on each side of said transverse cam arm; and
   (h) respective electrical contacts carried on said end portions of said contact strips, whereby said member may be moved to its alternate position to bring said electrical contacts into engagement with the L-shaped terminals of the power pack, and whereby the L-shaped terminals of the power pack are received between said locking arm and said member, thereby preventing the removal of the power pack from the device.

7. In a cordless electric device, the combination of:
(a) a housing;
(b) a removable power pack within said housing;
(c) a switch having an "on" position and an "off" position and including a removable key within said housing to move said switch to its "on" position;
(d) means to prevent said key from being removed from said housing in the "on" position of said switch; and
(e) means to prevent said power pack from being removed from said housing in the "on" position of said switch.

8. In a cordless electric device, the combination of:
(a) a housing;
(b) a removable power pack within said housing, said power pack having a pair of terminals;
(c) a switch having an "on" position and an "off" position and including electrical contact means engageable with said terminals of said power pack in the "on" position of the switch; and
(d) means to engage said terminals of said power pack and thereby to prevent said power pack from being removed from said housing in the "on" position of said switch;
(e) said last-named means also preventing the engagement of said electrical contact means with said respective terminals of said power pack in the event that the switch had already been moved to its "on" position prior to the insertion of said power pack within said housing.

9. In a cordless electrical device having a housing, a removable battery in the housing, and a switch in the housing for energizing the cordless device from the battery, the switch having "on" and "off" positions, that improvement in safety means, which comprises, in combination:
(a) a removable key in the housing for moving the switch from its "off" position to its "on" position and vice versa;
(b) means in the housing for preventing said key from being removed from the housing in the "on" position of the switch; and
(c) the switch including locking means for preventing the battery from being removed from the housing in the "on" position of the switch.

References Cited by the Examiner
UNITED STATES PATENTS

| | | | |
|---|---|---|---|
| 1,884,341 | 10/32 | Steinhart | 200—44 |
| 2,400,351 | 5/46 | Hart | 136—181.11 |

WINSTON A. DOUGLAS, *Primary Examiner.*
JOHN H. MACK, *Examiner.*